United States Patent

[11] 3,566,010

[72] Inventors Karl F. Drexler
　　　　　　　Burnt Hills;
　　　　　　　James S. Bishop, Schenectady, N.Y.
[21] Appl. No. 885,723
[22] Filed Dec. 17, 1969
[45] Patented Feb. 23, 1971
[73] Assignee General Electric Company

[54] HEAVY-DUTY INSULATING SUPPORT CONNECTOR
　　　5 Claims, 5 Drawing Figs.
[52] U.S. Cl. .................................................. 174/138,
　　　　　　　　　　　　　　　　　　　　　　310/260
[51] Int. Cl. ....................................................... H01b 17/00
[50] Field of Search ............................................ 174/138,
　　　　　　138.2, 138.3; 310/260, 270; 336/197

[56] References Cited
　　　　　　　UNITED STATES PATENTS
3,024,302　3/1962　Coggeshall ................... 310/260X
3,089,048　5/1963　Bahn et al. ................... 310/260
3,135,888　6/1964　Coggeshall ................... 336/197X
3,330,978　7/1967　Pettit ........................... 310/260
3,344,296　9/1967　Coggeshall et al. ........... 310/260
3,344,297　9/1967　Bishop et al. ................. 310/260
3,348,085　10/1967　Coggeshall et al. ........... 310/260
3,437,859　4/1969　Gibbs et al. .................. 174/138(.3)X Primary Examiner—Laramie E. Askin
Attorneys—William C. Crutcher, Frank L. Neuhauser, Oscar B. Waddell and Joseph B. Forman ABSTRACT: Insulating support members are secured to one another in an optimized manner to resist shear forces, tensile forces, compression forces and bending moments tending to separate the members, by means of an insulating dowel extending into holes in both members and held in place by a tension member of glass roving impregnated with curable resin.

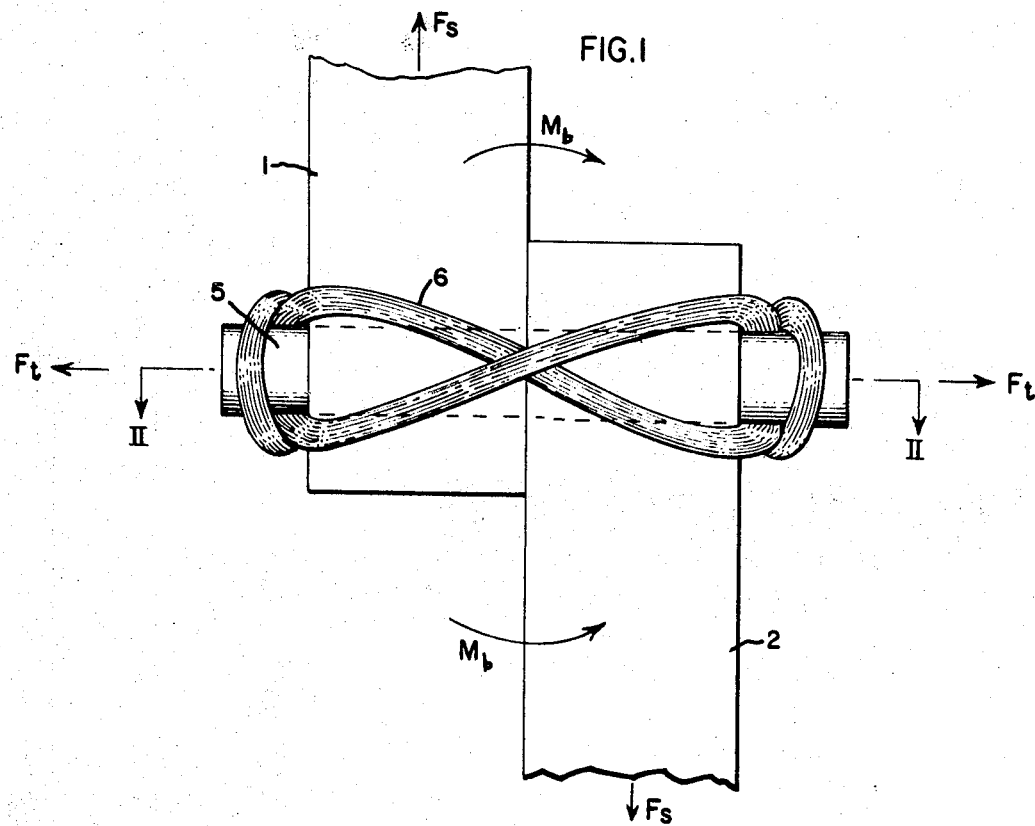
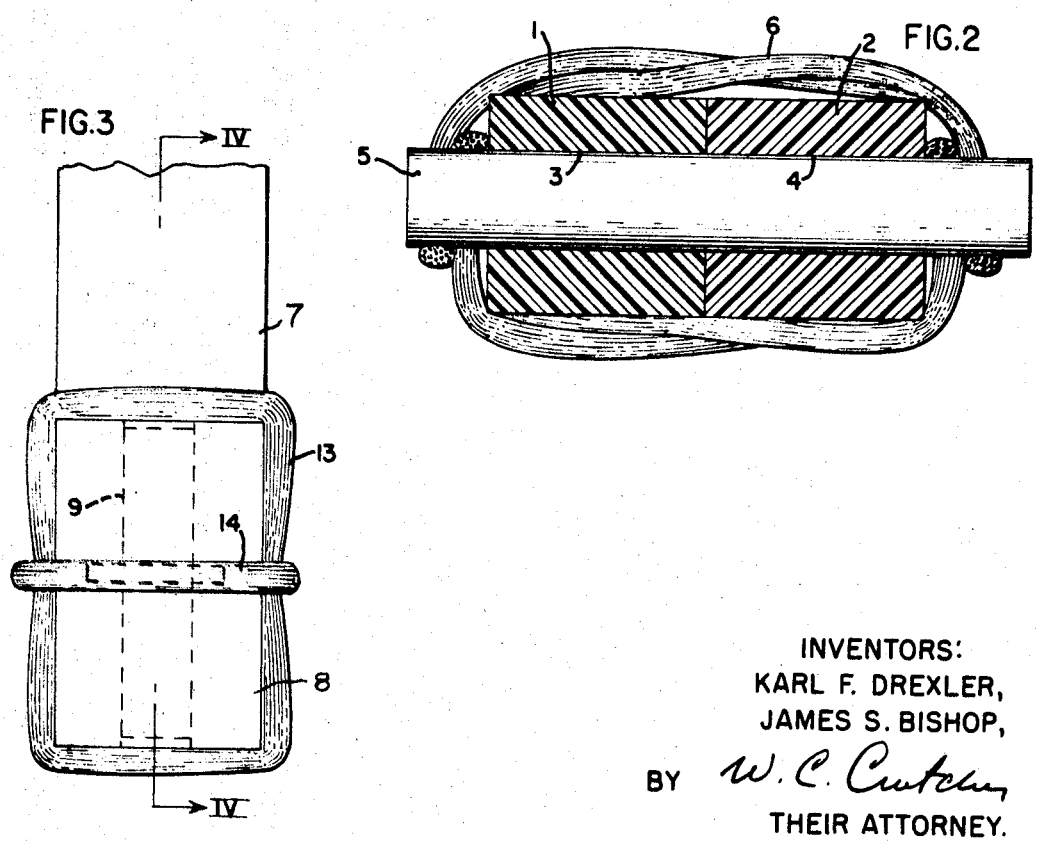

PATENTED FEB 23 1971 3,566,010

INVENTORS:
KARL F. DREXLER,
JAMES S. BISHOP,

BY W. C. Crutcher
THEIR ATTORNEY.

3,566,010

HEAVY-DUTY INSULATING SUPPORT CONNECTOR

BACKGROUND OF THE INVENTION

This invention relates generally to insulating heavy duty support members and to an improved arrangement for connecting the members to resist bending moments or forces tending to disengage the members.

In heavy-duty electrical apparatus, such as very large dynamoelectric machines or transformers, the parts are subjected to high electrical, magnetic and mechanical stresses. An example of parts subject to such stresses is found in the end winding supports and connection ring supports of very large generators, wherein a large number of parts connecting the machine elements and winding supports are found. Examples of such systems are seen in U.S. Pat. No. 3,089,048 issued to Bahn et al. on May 7, 1963 and U.S. Pat. No. 3,344,296 issued to Coggeshall et al. on Sept. 26, 1967, both patents being assigned to the present assignee. The support components in such machines have typically been made out of insulating material such as cotton cloth or glass cloth laminates.

Tension members of resin impregnated glass roving or tape have been suggested in the prior art, to hold insulated conductors or their spacer members in place or to tie insulating structural or support members together as exemplified in U.S. Pat. No. 3,024,302 to Coggeshall, U.S. Pat. No. 3,330,978 to Pettit, and U.S. Pat. No. 3,437,859 to Gibbs et al. However, there has always remained a residue of hardware necessary to reinforce or connect structural joints subject to complex loading. For these cases, manufacturers have utilized metal hardware, which is undesirable in the vicinity of electrical and magnetic fields, or insulating hardware, which has a lower strength, particularly in the case of threaded members.

Accordingly, one object of the present invention is to provide an improved heavy-duty insulating support connection for resisting high or complex loading tending to disengage the connected members.

Another object of the invention is to provide an improved insulating connection, wherein the various connector elements can be optimized with respect to tension, compression, shear and bending to obtain full advantage of the strength of the individual elements.

SUMMARY OF THE INVENTION

Briefly stated, the invention is practiced by providing an insulated dowel member tightly disposed in aligned holes in the members to be joined, and a tension tie, preferably of resin-impregnated glass roving, holding the members together under tension and also arranged to retain the dowel in place.

DRAWING

The invention, both as to organization and method of practice, together with further objects and advantages thereof, will best be understood by reference to the following specification, taken in connection with the accompanying drawings, in which:

FIG. 1 is a view of two insulated support members connected according to one form of the invention;

FIG. 2 is a cross section taken along lines II–II of FIG. 1;

FIG. 3 is a view of an alternate embodiment of the invention;

DESCRIPTION OF THE PREFERRED EMBODIMENT OF THE INVENTION

Figure 4:
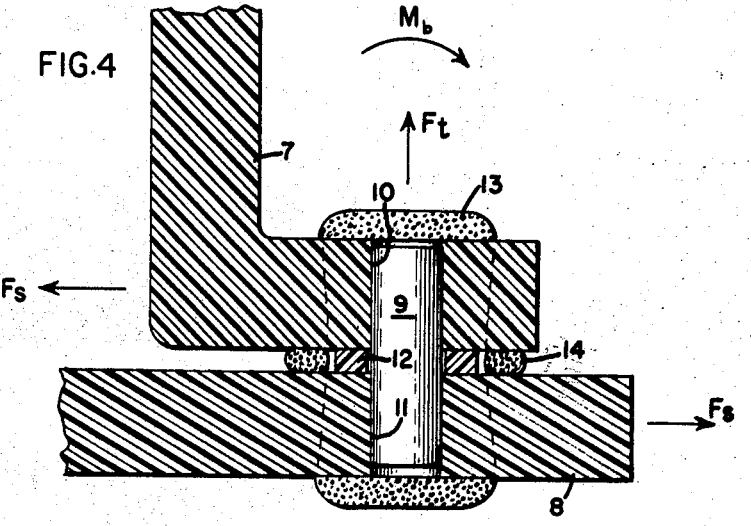
FIG. 4 is a cross section taken along lines IV–IV of FIG. 3.

Referring to FIGS. 1 and 2 of the drawing, support components 1 and 2 are joined together in the position shown. The exact function of members 1, 2 is immaterial to the present invention, but they might typically be end winding support members in a large generator or support members for the arcuate connection rings in the end turn region of such a generator or members in any heavy electrical apparatus subject to high electrical, magnetic, and mechanical stresses as in motors, transformers, bus bars, etc.

The material of members 1, 2 can be of any of the well-known high-strength insulating materials such as cotton cloth or glass cloth laminates commercially available as Textolite 1848 or Textolite 11637, resin-impregnated glass fiber, or even wood or vitreous materials in some instances.

Members 1, 2 have coaxial holes 3, 4 therethrough in which is disposed a tightly fitting dowel member 5. Dowel 5 is selected from a material having a high resistance to shear and bending and is preferably a polyester glass fiber material which is commercially available, an example being "Glasdramatic Rod" manufactured by Polygon Plastics Inc.

A tension tie 6 of insulated high strength material is looped back and forth around the members 1 and 2 and over the projecting ends of dowel 5 in a figure-eight pattern. Tension tie 6 is preferably a glass roving material commercially available, for example, as "Fiberglas Continuous K893" manufactured by Owens Corning Fiberglas Corp. However, a woven glass fiber tape is also suitable. The roving is impregnated with a suitable curable resin, such as a resin commonly known to the trade as a styrene-bearing unsaturated polyester resin. The roving in tie 6 is wound under tension, so that when the resin is cured to a rigid state, the portions passing over the projecting ends of dowel 5 will hold it securely in position and prevent it from coming out of the holes 3, 4.

Referring next to FIGS. 3 and 4 of the drawing, a modified form of the invention shows an L-shaped insulating member 7 secured to an insulating member 8. As before, a dowel 9 is disposed in coaxial holes 10, 11 in the members. An insulated washer member 12 spaces the elements 7 and 8 apart from one another. The length of dowel 9 is selected to be slightly shorter than the combined lengths of holes 10 and 11 including the spacer thickness.

A first insulated tension tie 13 of the same material as previously described is wound around the members 7, 8 and arranged to close off the ends of holes 10 and 11 so that the dowel 9 cannot come out.

In accordance with this embodiment of the invention, a second tension tie 14 is wound transversely around the first tie 13 in the space provided by the thickness of spacer 12. This tie serves to further tighten tie 13 as well as to fill the space between members 7, 8 and add additional surface area to that already provided by spacer 12 so as to absorb compressive force between the members.

Figure 5:
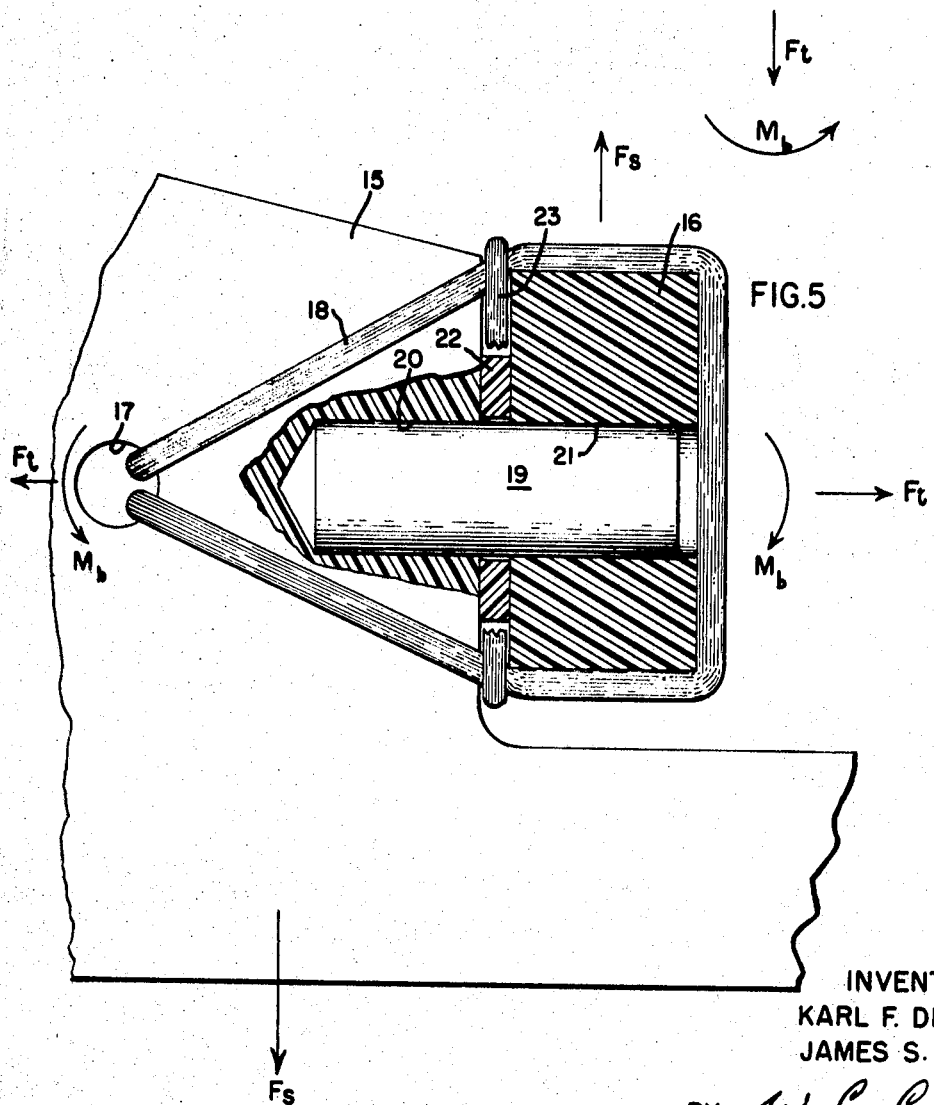
FIG. 5 is a view, partly in section, showing another modification of the invention.

Referring to a third embodiment shown in FIG. 5 of the drawing, a support member partially shown as 15 is connected to a ring member 16 shown in cross section. Typically, a series of circumferentially spaced members such as 15 would be used to support the end winding structure in a large generator and the ring 16 would serve to tie members 15 together as well as to support the windings. Member 15 has a hole 17 arranged to receive the loops of a tension tie 18 passing around ring 16. A dowel 19 is disposed in holes 20, 21 drilled in members 15, 16 respectively. An insulated washer 22 serves as a spacer between the members. A second tension tie 23 is wound around the first tension tie 18 using the space provided by spacer 22 as before. Tie 23 serves to tighten the first tie as well as to fill the space between members 15, 16.

OPERATION OF THE INVENTION

The structural members of FIGS. 1—5 are subjected to various forces in operation, as noted in the drawing such as tension forces $F_t$ which tend to separate the members. Oppositely directed compressive forces may also be present in the case of a sinusoidally varying force. The members are further subjected to shear forces $F_s$ which tend to separate the members along the joining plane. Bending moments $M_b$ tend to cause relative rotation between the structural members as indicated on the drawing.

In the disclosed connection, the dowel members serve to resist shear forces $F_s$, while the tension ties serve to resist tension forces $F_t$. Further, by virtue of the tight fit of the dowels, and the cooperation between the dowels and the tension ties holding them in place, bending moments $M_b$ are effectively resisted.

Embodiments of FIGS. 3—5 employing insulated washers and second tension ties are further effective where there are slight variations between a series of connected members. The second tension tie provides a compressive pad which supplements the spacer, contacting the surfaces between the members to fill out any unevenness.

Since the various connector elements perform different functions, the connection can be designed (knowing the types of forces to be exerted upon it) by optimizing the sizes and materials of the various elements.

Thus, there has been disclosed a highly effective insulated support which uses no metallic elements and provides high strength connections for insulated members.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

We claim:

1. A heavy-duty connection for insulated support members, comprising:
   first and second insulating members having first and second portions disposed adjacent one another, said portions defining first and second coaxial holes respectively;
   an insulating dowel member of high shear strength tightly disposed in said holes; and
   a first tension tie comprising strands of high tensile strength impregnated with curable resin wound under tension about said adjacent portions and also arranged to retain said dowel in said holes, the resin being cured to a rigid state.

2. The combination according to claim 1 including an insulated spacer having a hole therethrough aligned with the first and second holes and tightly disposed between said first and second portions of the insulated members with said dowel passing therethrough.

3. The combination according to claim 2 further including a second tie of resin impregnated strands passing around said first tie in the plane of said spacer and between the first and second portions, the resin being cured to a rigid state.

4. The combination according to claim 1, wherein said dowel has at least one end protruding from the first member hole on the side opposite the second member, said first tie passing about the protruding end to hold it in position.

5. The combination according to claim 1, wherein the first member hole extends completely therethrough, and wherein said dowel has an end disposed within said hole, the first tie being wound so as to cover the hole and retain the dowel in place.